United States Patent [19]

Mihm

[11] Patent Number: 5,490,690
[45] Date of Patent: Feb. 13, 1996

[54] VEHICLE SAFETY APPARATUS INCLUDING INFLATABLE RESTRAINT

[75] Inventor: Joseph J. Mihm, North Branch, Mich.

[73] Assignee: TRW Vehicle Safety Systems Inc., Lyndhurst, Ohio

[21] Appl. No.: 273,461

[22] Filed: Jul. 1, 1994

Related U.S. Application Data

[63] Continuation-in-part of Ser. No. 64,039, May 14, 1993, which is a continuation-in-part of Ser. No. 780,260, Oct. 21, 1991, abandoned.

[51] Int. Cl.$^6$ .................................................. B60R 21/16
[52] U.S. Cl. ...................... 280/728.2; 280/732; 280/740
[58] Field of Search ............................ 280/728 A, 732, 280/730, 728 R, 736, 737, 728.2, 728.1

[56]  References Cited

U.S. PATENT DOCUMENTS

| | | |
|---|---|---|
| 3,871,684 | 3/1975 | Staudacher et al. . |
| 4,810,005 | 3/1989 | Fohl . |
| 4,915,410 | 4/1990 | Bachelder . |
| 4,988,119 | 1/1991 | Hartmeyer ...................... 280/728 A |
| 5,069,480 | 12/1991 | Good ............................... 280/728 A |
| 5,088,764 | 2/1992 | Augustitus et al. . |
| 5,217,249 | 6/1993 | Kokeguchi . |
| 5,290,059 | 3/1994 | Smith et al. . |
| 5,346,174 | 10/1994 | Rhein et al. ........................ 280/732 |
| 5,346,248 | 9/1994 | Rhein et al. ........................ 280/732 |

FOREIGN PATENT DOCUMENTS

| | | | |
|---|---|---|---|
| 5-65048 | 3/1993 | Japan | ............................ 280/728 A |

Primary Examiner—Karin L. Tyson
Attorney, Agent, or Firm—Tarolli, Sundheim & Covell

[57]  ABSTRACT

An air bag module 10 includes an inflator (18) clamped between a first portion (14) and a second portion (16) of a housing (12). An air bag (20) is connected with a retaining ring (22). A series of fasteners (148, 150) on the retaining ring (22) extend through fastener openings (162, 164) in the air bag (20) and through fastener openings (96, 98) in the first portion (14) of the housing (12) and through fastener openings (126, 128) in the second portion (16) of the housing (12). The fasteners (148, 150) connect the air bag (20) with the retaining ring (22) and with the first and second portions (14, 16) of the housing (12).

24 Claims, 5 Drawing Sheets

VEHICLE SAFETY APPARATUS INCLUDING INFLATABLE RESTRAINT

RELATED APPLICATIONS

This application is a continuation-in-part of U.S. patent application Ser. No. 08/064,039 filed May 14, 1993, entitled "AIRBAG ASSEMBLY"; which is a continuation-in-part of U.S. patent application Ser. No. 07/780,260 filed Oct. 21, 1991, now abandoned entitled "AIR BAG REACTION CAN STRUCTURE AND METHOD OF ASSEMBLY".

BACKGROUND OF THE INVENTION

1. Technical Field

The present invention relates to a vehicle safety apparatus including an inflatable vehicle occupant restraint, and particularly relates to an air bag module including an inflator housing having separate portions which are connected by a plurality of fasteners.

2. Description of the Prior Art

A typical air bag module includes an air bag, an inflator for inflating the air bag, and a housing in which the air bag and the inflator are disposed. The housing is connected with a portion of the vehicle such as the vehicle instrument panel and supports the air bag and the inflator in the vehicle. In the event of a vehicle collision, the inflator is actuated to direct inflation fluid into the air bag. The air bag inflates into a position to restrain the vehicle occupant from forcefully striking parts of the vehicle.

It is known to form the housing of two or more separate parts which are secured together. It is also known to connect the air bag to a retaining ring and to secure the retaining ring to the housing.

SUMMARY OF THE INVENTION

The present invention is a vehicle safety apparatus comprising a housing including a first portion and a second portion which define a first chamber in the housing. At least one of the first and second portions has a series of fastener openings. An inflator is disposed in the first chamber between the first and second portions of the housing. The inflator includes a wall defining a second chamber in the inflator. An inflation fluid source is disposed in the second chamber in the inflator. The inflator wall has an outer surface extending between first and second opposite end portions of the inflator. The first portion of the housing and the second portion of the housing clamp the outer surface of the inflator wall and clamp the first and second end portions of the inflator. The vehicle safety apparatus includes an inflatable vehicle occupant restraint having an inflation fluid opening and a series of fastener openings. A plurality of fasteners extend through the fastener openings in the at least one portion of the housing and through the fastener openings in the inflatable restraint. The fasteners connect the first portion of the housing with the second portion of the housing and with the inflatable restraint.

In one embodiment of the invention, both the first portion of the housing and the second portion of the housing have a respective series of fastener openings. The fasteners are disposed on a retaining ring with which the inflatable restraint is connected. The fasteners on the retaining ring extend through the fastener openings in the first portion of the housing and through the fastener openings in the second portion of the housing and through the fastener openings in the inflatable restraint.

In another embodiment of the invention, the first portion of the housing includes the series of fastener openings, and the plurality of fasteners are disposed on the second portion of the housing. The inflatable restraint is connected with the second portion of the housing. The fasteners on the second portion of the housing extend through the fastener openings in the inflatable restraint and through the fastener openings in the first portion of the housing.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS OF THE INVENTION

Figure 1:
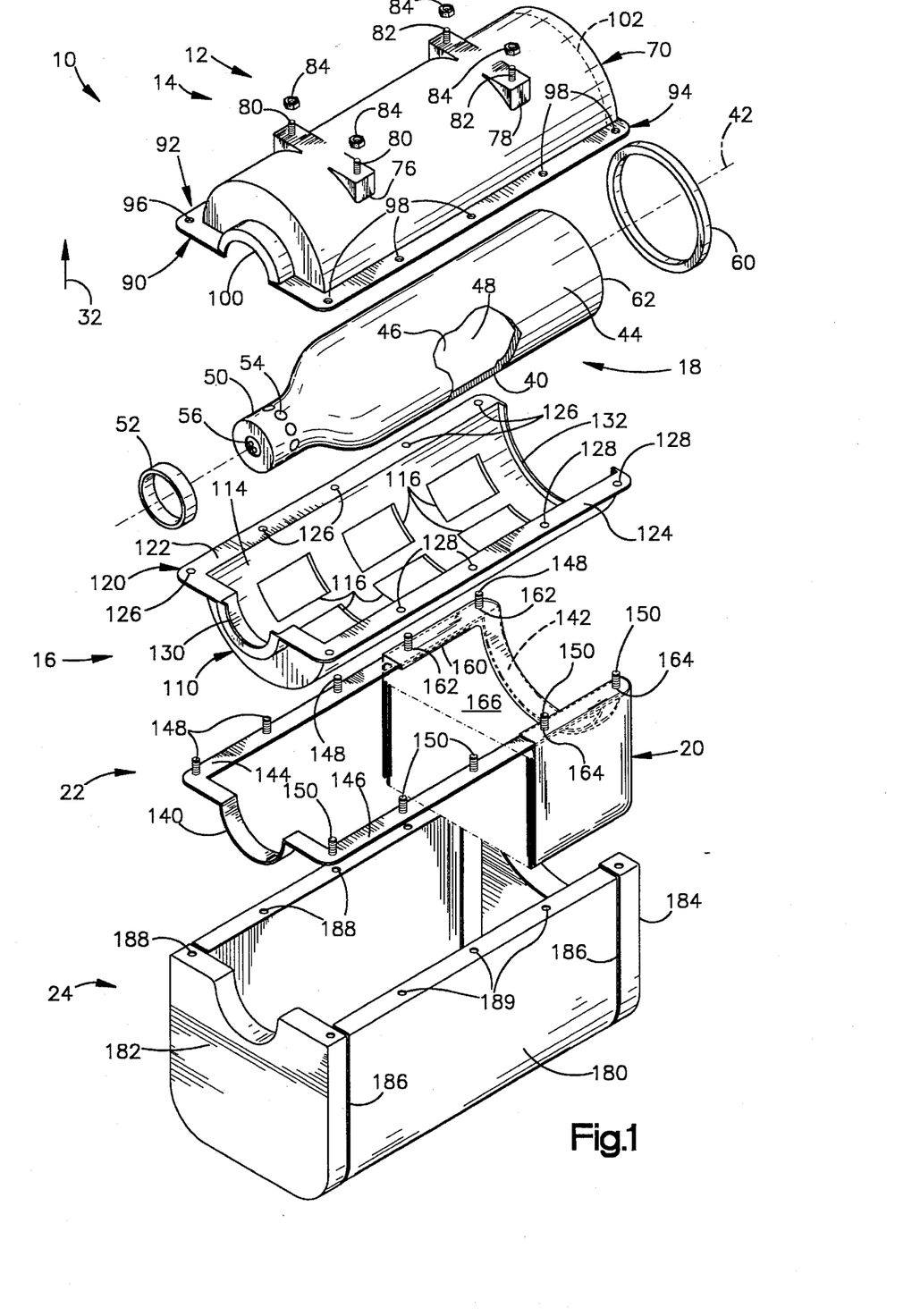
FIG. 1 is an exploded perspective view of an air bag module which is constructed in accordance with a first embodiment of the present invention.

The present invention relates to a vehicle safety apparatus including an inflatable vehicle occupant restraint. The present invention is applicable to various vehicle safety apparatus constructions. As representative of the present invention, FIG. 1 illustrates a vehicle safety apparatus or air bag module 10.

Figure 2:
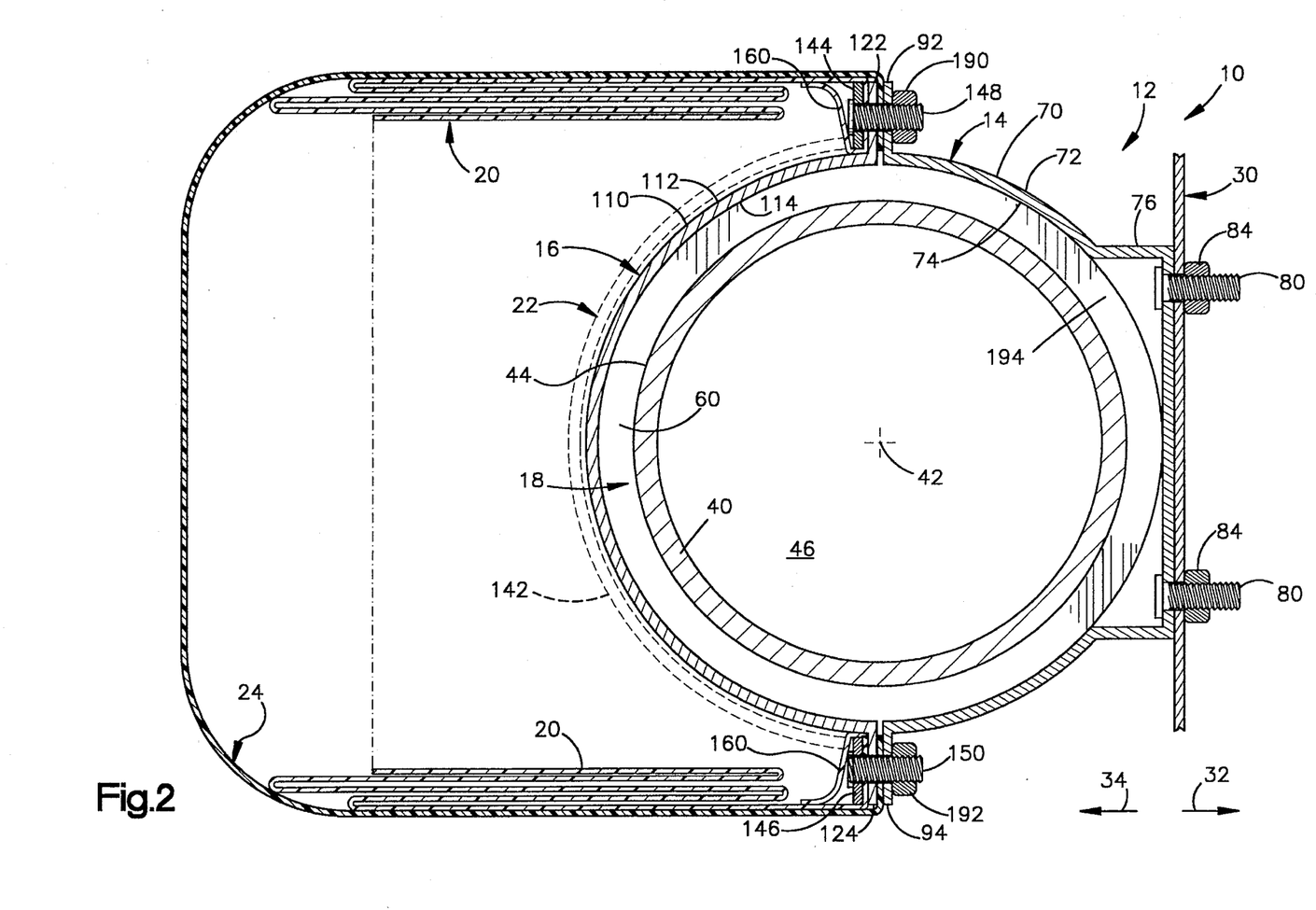
FIG. 2 is a sectional view of the air bag module of FIG. 1.

The air bag module 10 includes a housing 12 comprising a first portion 14 and a second portion 16. The module 10 also includes an inflator 18, an air bag 20, a retaining ring 22, and a cover 24. The module 10 is secured to a portion of a vehicle indicated at 30 (FIG. 2). The forward direction of travel of the vehicle is indicated by arrow 32 in FIG. 2, whereas arrow 34 in FIG. 2 indicates the rearward direction of vehicle travel. The parts of the module 10 are disposed in the vehicle in an orientation as illustrated in FIG. 2 with the inflator 18 disposed forward of the folded air bag 20.

The inflator 18 (FIGS. 1 and 2) has a generally elongate cylindrical configuration. A tubular wall 40 of the inflator 18 extends around a longitudinal central axis 42 of the module 10. The inflator wall 40 has a cylindrical outer surface 44 which extends between opposite end portions 50 and 62 of the inflator 18. The inflator wall 40 defines in the inflator 18 an inflation fluid chamber 46 within which is disposed a known inflation fluid 48 (FIG. 1). The inflation fluid 48 is a quantity of gas which is stored under pressure in the inflator 18 along with an ignitable material. Alternatively, the inflator 18 could contain a stored gas only or only a pyrotechnic gas generating material.

The housing 12 includes first and second annular elastomeric seal pads 52 and 60 (FIG. 1) which are disposed intermediate the housing portions 14 and 16. The seal pad 52 extends circumferentially around the outer surface 44 of the inflator wall 40 at the first end portion 50 of the inflator 18.

The seal pad 60 extends circumferentially around the outer surface 44 of the inflator wall 40 at the second end portion 62 of the inflator 18.

A circular array of inflation fluid outlets 54 is formed on the first end portion 50 of the inflator 18 at a location adjacent to and axially inward of the seal pad 52. An electrical connector 56 which may include a pair of lead wires is disposed on the end of the inflator 18. The connector 56 is electrically connected in a known manner with electric circuitry (not shown) of the vehicle 30, for receiving an electric current to actuate the inflator 18.

The first portion 14 of the housing 12 (FIGS. 1 and 2) has a clam shell configuration. The first portion 14 of the housing 12 includes a main body portion 70 having a generally cylindrical outer surface 72 and a generally cylindrical inner surface 74. A pair of axially spaced fastener supports 76 and 78 project forward from the main body portion 70. A pair of threaded studs 80 are welded to the fastener support 76 and a pair of threaded studs 82 are welded to the fastener support 78. The threaded studs 80 and 82 extend through openings in the vehicle portion 30. Nuts 84 are screwed on the threaded studs 80 and 82 to secure the first portion 14 of the housing 12 to the vehicle portion 30.

The first portion 14 of the housing 12 has an outer peripheral flange 90 (FIG. 1) which extends radially outward from the main body portion 70. The flange 90 includes upper (as viewed in FIG. 2) and lower planar portions 92 and 94. A series of axially spaced circular fastener openings 96 (FIGS. 1 and 3) is formed in the upper flange portion 92. Another series of axially spaced circular fastener openings 98 (FIG. 1) is formed in the lower flange portion 94 of the first portion 14 of the housing 12.

A first clamping portion 100 (FIG. 1) of the flange 90 is disposed at one axial end of the first portion 14 of the housing 12. The first clamping portion 90 is configured generally as an arc of a circle centered on the axis 42. A second clamping portion 102 of the flange 90 is disposed at the opposite axial end of the first portion 14 of the housing 12. The second clamping portion 102 is configured generally as an arc of a circle centered on the axis 42. The clamping portions 100 and 102 receive the annular seal pads 52 and 60, respectively, when the air bag module 10 is in the assembled condition illustrated in FIG. 2.

The second portion 16 of the housing 12 is generally similar in overall configuration to the first portion 14 of the housing. The second portion 16 of the housing 12 has a clam shell configuration as best seen in FIG. 1. The second portion 16 of the housing 12 includes a main body portion 110 having a cylindrical outer surface 112 (FIG. 2) and a cylindrical inner surface 114. A series of diffuser openings 116 (FIG. 1) extend through the main body portion 110 between the outer and inner surfaces 112 and 114.

The second portion 16 of the housing 12 has an outer peripheral flange 120 which extends radially outward from the main body portion 110. The flange 120 includes planar upper and lower (as viewed in FIG. 1) portions 122 and 124. A series of axially spaced circular fastener openings 126 is formed in the flange portion 122. A series of axially spaced circular fastener openings 128 is formed in the flange portion 124.

A first clamping portion 130 (FIG. 1) of the flange 120 is disposed at one axial end of the second portion 16 of the housing 12. The clamping portion 130 is configured generally as an arc of a circle centered on the axis 42. The clamping portion 130 receives the first seal pad 52 when the air bag module 10 is in the assembled condition illustrated in FIG. 2. A second clamping portion 132 is disposed at the opposite axial end of the housing portion 16. The second clamping portion 132 is configured generally as an arc of a circle centered on the axis 42. The clamping portion 132 receives the second seal pad 60 when the air bag module 10 is in the assembled condition illustrated in FIG. 2.

The retaining ring 22 (FIGS. 1 and 2) is similar in overall configuration to the flange 120 of the second portion 16 of the housing 12. The retaining ring 22 has an arcuate first end portion 140 which is configured generally as an arc of a circle centered approximately on the axis 42. The first end portion 140 of the retaining ring 22 overlies the arcuate first clamping portion 130 of the second portion 16 of the housing 12. The first end portion 140 of the retaining ring 22 is disposed radially outward of the first seal pad 52 and the first end portion 50 of the inflator 18. An arcuate second end portion 142 of the retaining ring 22 overlies the arcuate second clamping portion 132 of the second portion 16 of the housing 12. The second end portion 142 of the retaining ring 22 is configured generally as an arc of a circle centered approximately on the axis 42. The second end portion 142 of the retaining ring 22 is disposed radially outward of the seal pad 60 and the second end portion 62 of the inflator 18.

The retaining ring 22 includes parallel planar upper and lower (as viewed in FIG. 1) portions 144 and 146 which extend axially between the arcuate end portions 140 and 142. A series of fasteners 148 is disposed on the upper portion 144 of the retaining ring 22. The fasteners 148 are cylindrical externally threaded studs which are welded or otherwise fastened to the upper portion 144 of the retaining ring 22. The fasteners 148 project forward in the direction indicated by the arrow 32 from the upper portion 144 of the retaining ring. The fasteners 148 are spaced apart axially along the retaining ring 22 so as to align with the fastener openings 126 in the second portion 16 of the housing 12 and the fastener openings 96 in the first portion 14 of the housing.

A series of fasteners 150 is disposed on the lower portion 146 of the retaining ring 22. The fasteners 150 are identical to the fasteners 148. The fasteners 150 project forward in the direction indicated by the arrow 32 (FIG. 2) from the lower portion 146 of the retaining ring 22. The fasteners 150 are spaced apart axially along the retaining ring 22 so as to align with the fastener openings 128 in the second portion 16 of the housing 12 and the fastener openings 98 in the first portion 14 of the housing.

The air bag 20 (FIGS. 1 and 2) is made from a fabric material, preferably woven nylon. An attachment portion 160 of the air bag 20 is wrapped around the retaining ring 22 and sewn to secure the air bag to the retaining ring. Two rows of axially spaced circular fastener openings 162 (FIGS. 1 and 3) and 164 (FIG. 1) are formed in the attachment portion 160 of the air bag 20.

The cover 24 (FIGS. 1 and 2) is made from a thin paper or plastic material, preferably TYVEK® brand flexible polyethylene sheet material which is available from E. I. Dupont de Nemours & Co. of Delaware. The cover 24 includes a central portion 180 and opposite end portions 182 and 184. A plurality of gaps 186 allow for the cover 24 to be wrapped tightly around the folded air bag 20. Two rows of axially spaced circular fastener openings 188 and 189 are formed in the cover 24.

In assembly of the air bag module 10, the attachment portion 160 of the air bag 20 is wrapped around the retaining ring 22 in a manner such that the fasteners 148 and 150 on the retaining ring extend through the fastener openings 162 and 164, respectively, in the air bag. The attachment portion 160 of the air bag 20 is sewn to secure the air bag to the retaining ring 22. The air bag 20 is folded in a known manner so as to define an inflation fluid opening 166 through which inflation fluid can be directed from the inflator 18.

The housing portions 14 and 16, the seals 52 and 60, the inflator 18, and the cover 24 are then secured by the fasteners 148 and 150 to the assembly of the air bag 20 and retaining ring 22. The fasteners 148 (FIG. 3) on the upper portion 144 of the retaining ring 22 extend through the fastener openings 162 in the air bag 20 and through the fastener openings 126 in the upper flange portion 122 of the second portion 16 of the housing 12. The fasteners 148 also extend through the fastener openings 188 in the cover 24 and through the fastener openings 96 in the upper flange portion 92 of the first portion 14 of the housing. A plurality of nuts 190 (FIG. 2) are screwed on the fasteners 148. The fasteners 150 (FIGS. 1 and 2) extend through the fastener openings 164 in the air bag 20 and through the fastener openings 128 in the lower flange portion 124 of the second portion 16 of the housing 12. The fasteners 150 also extend through the fastener openings 189 in the cover 24 and through the fastener openings 98 in the lower flange portion 94 of the second portion 14 of the housing. A plurality of nuts 192 (FIG. 2) are screwed on the lower fasteners 150.

The seal pads 52 and 60 (FIG. 1) are clamped between the first and second housing portions 14 and 16. The housing portions 12 and 14, acting through the seal pads 52 and 60, clamp the outer surface 44 of the inflator wall 40 at the inflator end portions 50 and 62. The inflator 18 is thus clamped in the housing 12 in a diffuser chamber 194 (FIG. 2) between the housing portions 14 and 16. The chamber 194 is an annular gap between the inflator 18 and the housing 12 which gap extends between the seal pads 52 and 60. The retaining ring 22, with the air bag 20 connected thereto, is clamped against the flange 120 of the second portion 16 of the housing 12. The cover 24 is wrapped tightly around the air bag 20 to keep the air bag in its folded and stored condition. The assembled air bag module 10 is secured to the vehicle 30 (FIG. 2) by the studs 80 and 82 and the nuts 84.

In the event of a vehicle collision, a collision sensor in the electric circuitry (not shown) of the vehicle causes an electric current to flow through the electrical connector 56 to actuate the inflator 18. Inflation fluid is directed from the inflator 18 through the inflation fluid outlets 54 into the diffuser chamber 194 between the inflator 18 and the housing 12. The inflation fluid flows around the inflator 18 and along the length of the inflator. The inflation fluid exits the chamber 194 through the diffuser openings 116 in the second portion 16 of the housing 12 and passes through the inflation fluid opening 166 into the air bag 20. The air bag 20 inflates from the folded and stored condition shown in FIG. 2 to an unfolded and inflated condition (not shown). As the air bag 20 inflates, it ruptures the cover 24. The inflating air bag 20 also displaces or opens another cover (not shown) which forms a part of the vehicle visible to an occupant and which is made of a relatively rigid material to protect the air bag when the module 10 is mounted in the vehicle 30. The air bag 20 inflates into a position in the vehicle to restrain a vehicle occupant.

Figure 3:
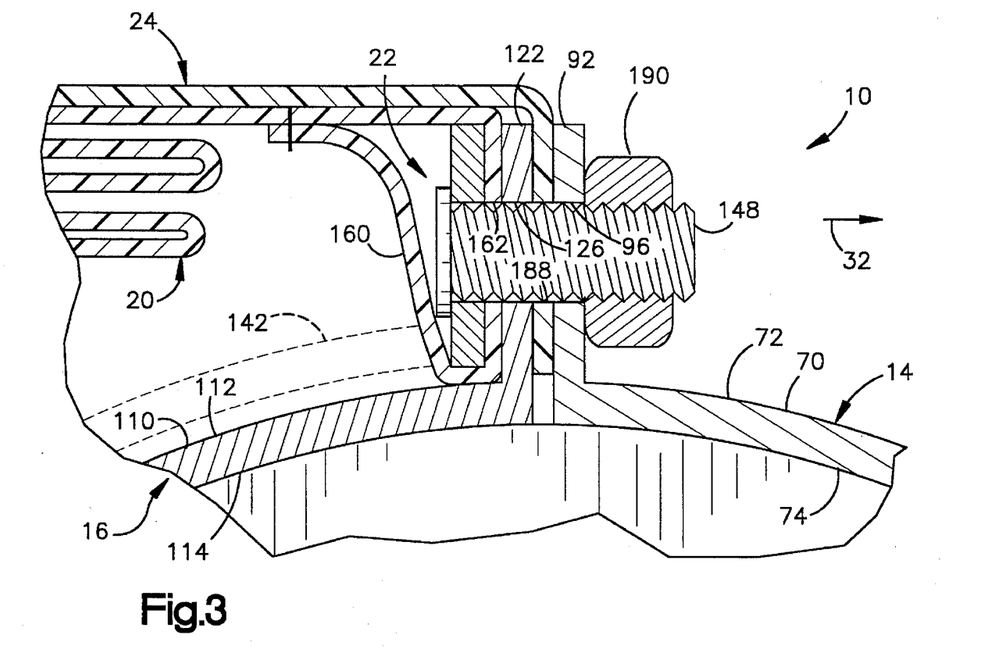
FIG. 3 is an enlarged view of a portion of FIG. 2.
Figure 4:
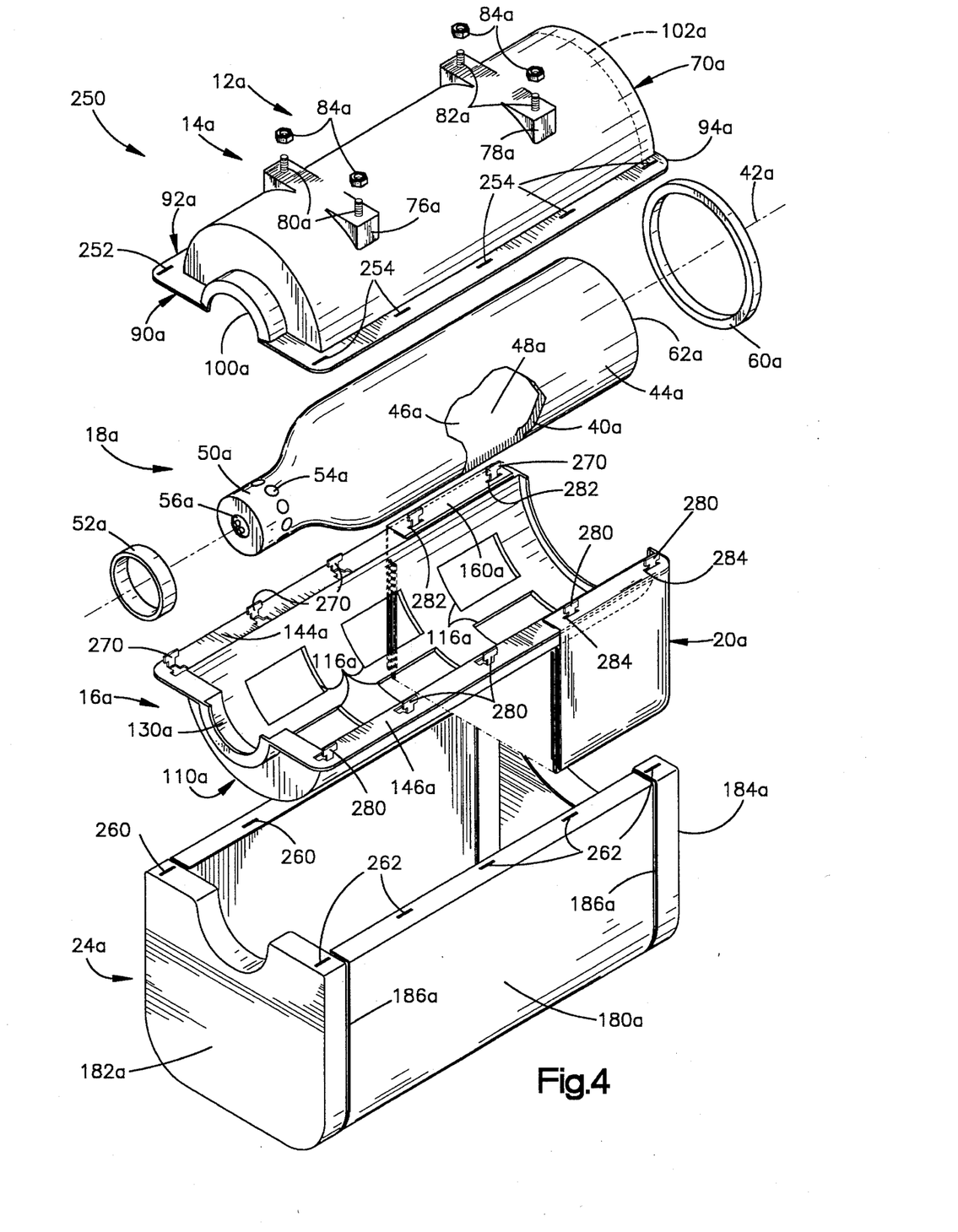
FIG. 4 is an exploded perspective view of an air bag module which is constructed in accordance with a second embodiment of the present invention.
Figure 5:
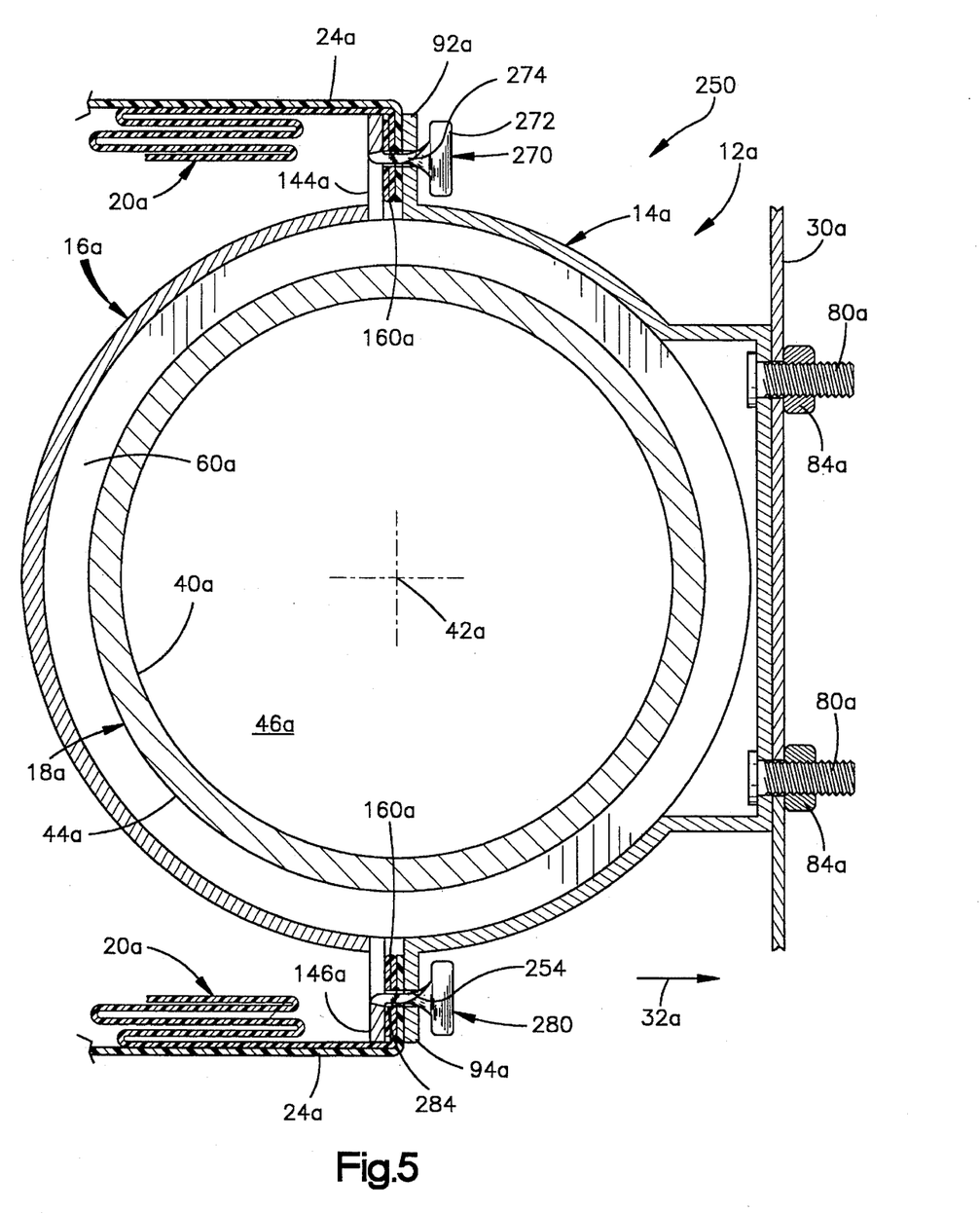
FIG. 5 is a sectional view of the air bag module of FIG. 4.
Figure 6:
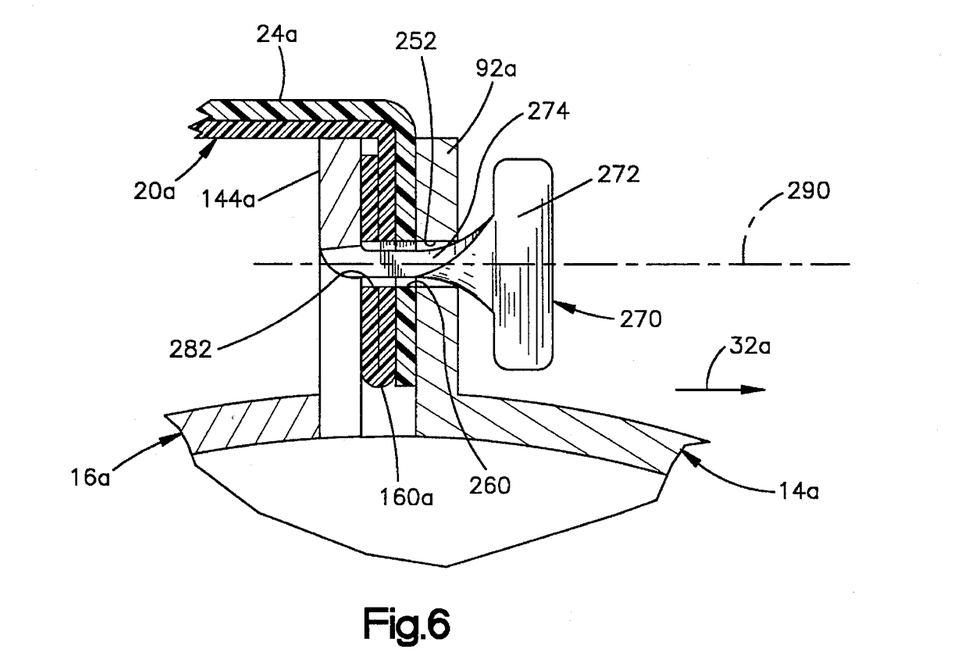
FIG. 6 is an enlarged view of a portion of FIG. 5.

FIGS. 4–6 illustrate a vehicle safety apparatus or air bag module 250 which is constructed in accordance with a second embodiment of the present invention. The air bag module 250 is generally similar to the air bag module 10 (FIGS. 1–3). Thus, parts and elements in FIGS. 4–6 which are the same as or similar to corresponding parts and elements in FIGS. 1–3 are given the same reference numeral with the suffix "a" attached.

The air bag module 250 (FIGS. 4–6) includes a housing 12a having a first portion 14a and a second portion 16a. The first portion 14a of the housing 12a is generally similar to the first portion 14 (FIGS. 1–3) of the air bag module 10. However, in place of the circular fastener openings 96 and 98 in the housing portion 14, the housing portion 14a (FIG. 4) includes fastener openings which are configured as elongate slots 252, 254. A series of axially extending elongate slots 252 (FIGS. 4 and 6) is formed in the upper flange portion 92a of the first portion 14a of the housing 12a. A series of axially extending elongate slots 254 (FIGS. 4 and 5) is formed in the lower flange portion 94a of the first portion 14a of the housing 12a. The cover 24a (FIG. 4) also includes two rows of elongate slots 260 and 262 instead of circular fastener openings.

The air bag 20a includes an attachment portion 160a (FIGS. 4 and 6) which is configured as a double layered, folded over edge portion of the air bag. The attachment portion 160a overlies the upper and lower flange portions 144a and 146a (FIG. 4) of the second portion 16a of the housing 12a. Two rows of axially spaced fastener openings 282 and 284, which are configured as elongate slots are formed in the attachment portion 160a of the air bag 20a.

The air bag module 250 does not include a separate retaining ring such as the retaining ring 22 (FIG. 1) with threaded studs 148 and 150. Instead, a series of twist tabs 270 (FIG. 4) is formed on the upper flange portion 144a of the second portion 16a of the housing 12a. Each twist tab 270 is bent out of the material of the upper flange portion 144a and includes a flat elongate head portion 272 (FIGS. 5 and 6) supported on a relatively narrow neck portion 274. The twist tabs 270 project forward from the second portion 16a of the housing 12a in a direction 32a toward the first portion 14a of the housing.

Another series of twist tabs 280 (FIGS. 4 and 5) is formed on the lower flange portion 146a of the second portion 16a of the housing 12a. The twist tabs 280 are identical in construction to the twist tabs 270. The twist tabs 280 are bent out of the material of the lower flange portion 146a of the second portion 16a of the housing 12a. The twist tabs 280 project from the second portion 16a of the housing 12a in the direction 32a toward the first portion 14a of the housing.

The twist tabs 270 (FIG. 6) on the upper flange portion 144a of the second portion 16a of the housing 12a extend through the slots 282 in the attachment portion 160a of the air bag 20a. The twist tabs 270 also extend through the slots 260 in the cover 24a and through the slots 252 in the flange portion 92a of the first portion 14a of the housing 12a. (FIG. 6 is taken through slots 282, 260, and 252, but not through the twist tab 270 itself, so as to show more clearly the formation of the twist tab.) The twist tabs 280 (FIG. 5) on the lower flange portion 146a of the second portion 16a of the housing 12a extend through the slots 284 in the attachment portion 160a of the air bag 20a. The twist tabs 280 also extend through the slots 262 (FIG. 4) in the cover 24a and through the slots 254 (FIG. 5) in the first portion 14a of the housing 12a.

To secure the parts of the air bag module 250 in the assembled condition shown in FIGS. 5 and 6, the head portion 272 of each twist tab 270 (FIG. 6) is rotated about an axis 290 extending through the neck portion 274. The neck portion 274 of each twist tab 270 deforms to allow rotation of the head portion 272 relative to the second portion 16a of the housing 12a. The head portion 272 of each twist tab 270 is rotated by a sufficient amount, in the range of from about 10° to about 90°, so as to block movement of the head portion 272 through the slot 252 in the flange 92a of the first portion 14a of the housing 12a. In a similar manner, the head portions of the lower twist tabs 280 (FIG. 5) are rotated so as to block movement of the twist tabs 280 through the slots 254 in the lower flange portion 94a of the first portion 14a of the housing 12a.

From the above description of the invention, those skilled in the art will perceive improvements, changes and modifications in the invention. For example, the threaded studs 148 and 150 on the retaining ring 22 (FIGS. 1–3) could be replaced with other types of fasteners such as the twist tabs 270 and 280 (FIGS. 4–6). The twist tabs 270 and 280 on the second portion 16a of the housing 12a (FIGS. 4–6) could be replaced with other types of fasteners such as the threaded studs 148 and 150 (FIGS. 1–3). Such improvements, changes and modifications within the skill of the art are intended to be covered by the appended claims.

Having described the invention, I claim:

1. A vehicle safety apparatus comprising:

a housing including a first portion and a second portion which define a first chamber in said housing, at least one of said first and second portions having a series of fastener openings;

said first portion of said housing having first and second opposite end portions and said second portion of said housing having first and second opposite end portions;

an inflator disposed in said first chamber between said first and second portions of said housing, said inflator including a wall defining a second chamber in said inflator, an inflation fluid source disposed in said second chamber in said inflator, said inflator wall having an outer surface extending between first and second opposite end portions of said inflator;

said first end portion of said inflator being clamped with said first end portion of said first housing portion and said first end portion of said second housing portion, said second end portion of said inflator being clamped with said second end portion of said first housing portion and said second end portion of said second housing portion;

an inflatable vehicle occupant restraint having an inflation fluid opening and a series of fastener openings; and a plurality of fasteners extending through said fastener openings in said at least one portion of said housing and through said fastener openings in said inflatable restraint, said fasteners connecting said first portion of said housing with said second portion of said housing and with said inflatable restraint.

2. An apparatus as set forth in claim 1 wherein each of said first and second portions of said housing includes a respective series of fastener openings, said plurality of fasteners extending through said fastener openings in said first portion of said housing and through said fastener openings in said second portion of said housing and through said fastener openings in said inflatable restraint.

3. An apparatus as set forth in claim 2 further comprising a retaining ring connected with said inflatable restraint, said inflatable restraint being secured to said retaining ring, said fasteners projecting in a direction away from said retaining ring through said fastener openings in said first portion of said housing and through said fastener openings in said second portion of said housing and through said fastener openings in said inflatable restraint.

4. An apparatus as set forth in claim 3 wherein:

said first portion of said housing comprises a clam shell shaped main body portion and a radial flange extending around the outer periphery of said body portion, said series of fastener openings in said first portion of said housing being formed in said flange; and said second portion of said housing comprises a clam shell shaped main body portion and a radial flange extending around the outer periphery of said body portion, said series of fastener openings in said second portion of said housing being formed in said flange on said second portion of said housing.

5. An apparatus as set forth in claim 3 wherein said first portion of said housing includes said series of fastener openings and said second portion of said housing includes said plurality of fasteners, said plurality of fasteners on said second portion of said housing extending through said fastener openings in said first portion of said housing and through said fastener openings in said inflatable restraint, said fasteners connecting said second portion of said housing with said first portion of said housing and with said inflatable restraint.

6. An apparatus as set forth in claim 5 wherein:

said first portion of said housing comprises a clam shell shaped main body portion and a radial flange extending around the outer periphery of said body portion, said series of fastener openings in said first portion of said housing being formed in said flange of said first portion of said housing; and said second portion of said housing comprises a clam shell shaped main body portion and a radial flange extending around the outer periphery of said body portion, said plurality of fasteners on said second portion of said housing being disposed on said flange of said second portion of said housing and projecting from said flange of said second portion of said housing.

7. An apparatus as set forth in claim 1 wherein said first portion of said housing includes mounting means for mounting said vehicle safety apparatus on a vehicle, said mounting means comprising a plurality of mounting members fixed to said first portion of said housing and projecting from said first portion of said housing in a direction away from said second portion of said housing, said mounting members being engageable with a portion of a vehicle to mount said vehicle safety apparatus on a vehicle.

8. An apparatus as set forth in claim 1 wherein said first portion of said housing comprises a clam shell shaped main body portion and a radial flange extending around the outer periphery of said body portion, said series of fastener openings being formed in said flange of said first portion of said housing;

said second portion of said housing comprising a clam shell shaped main body portion and a radial flange extending around the outer periphery of said body portion;

said plurality of fasteners extending through said fastener openings in said outer peripheral flange of said first portion of said housing and through said fastener openings in said inflatable restraint;

said inflator wall being generally cylindrical in configuration and extending about a longitudinal central axis of said inflator;

said first end portion of said first portion of said housing being configured as an arc of a circle centered on said axis and clamping said first end portion of said inflator, and said second end portion of said first portion of said housing being configured as an arc of a circle centered on said axis and clamping said second end portion of said inflator;

said first end portion of said second portion of said housing being configured as an arc of a circle centered on said axis and clamping said first end portion of said inflator, and said second end portion of said second portion of said housing being configured as an arc of a circle centered on said axis and clamping said second end portion of said inflator.

9. An apparatus as set forth in claim 1 wherein said fasteners comprise threaded studs.

10. An apparatus as set forth in claim 1 wherein said plurality of fasteners comprises a plurality of twist tabs on said second portion of said housing.

11. A vehicle safety apparatus comprising:

a housing including a first portion and a second portion which define a first chamber in said housing, said first portion and said second portion each having a series of fastener openings;

said first portion of said housing having first and second opposite end portions and said second portion of said housing having first and second opposite end portions;

an inflator disposed in said first chamber between said first and second portions of said housing, said inflator including a wall defining a second chamber in said inflator, an inflation fluid source disposed in said second chamber in said inflator, said inflator wall having an outer surface extending between first and second opposite end portions of said inflator;

said first end portion of said inflator being clamped with said first end portion of said first housing portion and said first end portion of said second housing portion, said second end portion of said inflator being clamped with said second end portion of said first housing portion and said second end portion of said second housing portion;

an inflatable vehicle occupant restraint having an inflation fluid opening and a series of fastener openings; and a plurality of fasteners extending through said fastener openings in said first portion of said housing and through said fastener openings in said second portion of said housing and through said fastener openings in said inflatable restraint, said fasteners connecting said first portion of said housing with said second portion of said housing and with said inflatable restraint.

12. An apparatus as set forth in claim 11 further comprising a retaining ring connected with said inflatable restraint, said inflatable restraint being secured to said retaining ring, said fasteners projecting in a direction away from said retaining ring through said fastener openings in said first portion of said housing and through said fastener openings in said second portion of said housing and through said fastener openings in said inflatable restraint.

13. An apparatus as set forth in claim 12 wherein:

said first portion of said housing comprises a clam shell shaped main body portion and a radial flange extending around the outer periphery of said body portion, said series of fastener openings in said first portion of said housing being formed in said flange of said first portion of said housing; and said second portion of said housing comprises a clam shell shaped main body portion and a radial flange extending around the outer periphery of said body portion, said series of fastener openings in said second portion of said housing being formed in said flange of said second portion of said housing.

14. An apparatus as set forth in claim 13 wherein:

said inflator wall is cylindrical in configuration and extends about a longitudinal central axis of said inflator;

said first end portion of said first portion of said housing being configured as an arc of a circle centered on said axis and clamping said first end portion of said inflator and said second end portion of said first portion of said housing being configured as an arc of a circle centered on said axis and clamping said second end portion of said inflator; and said first end portion of said second portion of said housing being configured as an arc of a circle centered on said axis and clamping said first end portion of said inflator and said second end portion of said second portion of said housing being configured as an arc of a circle centered on said axis and clamping said second end portion of said inflator.

15. An apparatus as set forth in claim 14 wherein said first portion of said housing includes mounting means for mounting said vehicle safety apparatus on a vehicle, said mounting means comprising a plurality of mounting members fixed to said main body portion of said first portion of said housing and projecting from said main body portion of said first portion of said housing in a direction away from said second portion of said housing, said mounting members being engageable with a portion of a vehicle to support said vehicle safety apparatus on a vehicle.

16. An apparatus as set forth in claim 10 wherein each one of said twist tabs includes a flat elongate head portion supported on a relatively narrow neck portion associated with said head portion;

said twist tabs projecting from said second portion of said housing in a direction toward said first portion of said housing;

said fastener openings in said at least one portion of said housing comprising fastener openings in said first portion of said housing;

said twist tabs extending through said fastener openings in said inflatable restraint and through said fastener openings in said first portion of said housing;

each one of said head portions of said twist tabs being rotated about a respective axis extending through a respective associated neck portion, said neck portions of said twist tabs deforming to allow rotation of said head portions relative to said second portion of said housing.

17. An apparatus as set forth in claim 16 wherein said head portions of said twist tabs are rotated relative to said neck portions by a sufficient amount so as to block movement of said head portions through said fastener openings in said first portion of said housing.

18. An apparatus as set forth in claim 17 wherein said head portions of said twist tabs are rotated relative to said neck portions by an amount in the range of from about 10° to about 90°.

19. An apparatus as set forth in claim 16 wherein said twist tabs are bent out of the material of said second portion of said housing.

20. A vehicle safety apparatus comprising:

a housing including a first portion and a second portion which define a first chamber in said housing, said first portion of said housing having a series of fastener openings;

said first portion of said housing having first and second opposite end portions and said second portion of said housing having first and second opposite end portions;

an inflator disposed in said first chamber between said first and second portions of said housing, said inflator including a wall defining a second chamber in said inflator, an inflation fluid source disposed in said second chamber in said inflator, said inflator wall having an outer surface extending between first and second opposite end portions of said inflator;

said first end portion of said inflator being clamped with said first end portion of said first housing portion and said first end portion of said second housing portion, and said second end portion of said inflator being clamped with said second end portion of said first housing portion and said second end portion of said second housing portion;

an inflatable vehicle occupant restraint having an inflation fluid opening and a series of fastener openings; and a plurality of twist tabs on said second portion of said housing, said twist tabs extending through said fastener openings in said first portion of said housing and through said fastener openings in said inflatable restraint, said twist connecting said first portion of said housing with said second portion of said housing and with said inflatable restraint.

21. An apparatus as set forth in claim 20 wherein each one of said twist tabs includes a flat elongate head portion supported on a relatively narrow neck portion associated with said head portion;

said twist tabs projecting from said second portion of said housing in a direction toward said first portion of said housing;

said twist tabs extending through said fastener openings in said inflatable restraint and through said fastener openings in said first portion of said housing;

each one of said head portions of said twist tabs being rotated about a respective axis extending through a respective associated neck portion, said neck portions of said twist tabs deforming to allow rotation of said head portions relative to said second portion of said housing.

22. An apparatus as set forth in claim 21 wherein said head portions of said twist tabs are rotated relative to said neck portions by a sufficient amount so as to block movement of said head portions through said fastener openings in said first portion of said housing.

23. An apparatus as set forth in claim 22 wherein said head portions of said twist tabs are rotated relative to said neck portions by an amount in the range of from about 10° to about 90°.

24. An apparatus as set forth in claim 20 wherein said twist tabs are bent out of the material of said second portion of said housing.

\* \* \* \* \*

UNITED STATES PATENT AND TRADEMARK OFFICE
CERTIFICATE OF CORRECTION

PATENT NO. : 5,490,690
DATED : February 13, 1996
INVENTOR(S) : Joseph J. Mihm

It is certified that error appears in the above-indentified patent and that said Letters Patent is hereby corrected as shown below:

Column 8, line 10, change "3" to --1--.

Signed and Sealed this

First Day of October, 1996

Attest:

BRUCE LEHMAN

Attesting Officer     Commissioner of Patents and Trademarks